(12) United States Patent
Dinkel et al.

(10) Patent No.: US 6,398,315 B1
(45) Date of Patent: Jun. 4, 2002

(54) HYDRAULIC UNIT FOR SLIP-CONTROLLED BRAKE SYSTEMS

(75) Inventors: Dieter Dinkel, Eppstein/Ts.; Axel Hinz, Neu-Anspach; Hans-Dieter Reinartz, Frankfurt am Main, all of (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 09/554,396

(22) PCT Filed: Nov. 11, 1998

(86) PCT No.: PCT/EP98/07226
§ 371 (c)(1),
(2), (4) Date: Aug. 8, 2000

(87) PCT Pub. No.: WO99/25594
PCT Pub. Date: May 27, 1999

(30) Foreign Application Priority Data

Nov. 14, 1997 (DE) .......................... 197 50 458
Feb. 13, 1998 (DE) .......................... 198 05 843

(51) Int. Cl.[7] ................................. B60T 8/34
(52) U.S. Cl. ........................... 303/113.1; 303/119.3; 303/DIG. 10
(58) Field of Search .................. 303/113.1, 113.2, 303/113.3, 116.1, 116.2, 116.3, 116.4, 119.1, 119.2, 119.3, DIG. 10, DIG. 11, 10, 11, 12

(56) References Cited

U.S. PATENT DOCUMENTS

| | | | |
|---|---|---|---|
| 5,244,262 A | 9/1993 | Kehl et al. | |
| 5,449,226 A | 9/1995 | Fujita et al. | 303/116.4 |
| 5,975,652 A * | 11/1999 | Otto | 303/113.1 |
| 6,260,933 B1 * | 7/2001 | Dinkel et al. | 303/113.1 |

FOREIGN PATENT DOCUMENTS

| | | |
|---|---|---|
| DE | 40 13 159 | 10/1991 |
| DE | 40 13 160 | 10/1991 |
| EP | 0 373 551 | 6/1990 |
| EP | 0 675 030 | 10/1995 |
| WO | WO 91/16221 | 10/1991 |
| WO | WO 95/05543 | 2/1995 |

OTHER PUBLICATIONS

Jonner, W.–D.; Maisch, W.; Mergenthaler, R.; and Sigl, A., Antiblockiersystem und Antriebsschlupf–regelung der fünften Generation, *ATZ Automobiltechnische Zeitschrift*, vol. 95, No. 11, Nov., 1993, pp. 572–574 and 579–580.

* cited by examiner

*Primary Examiner*—Pam Rodriguez
(74) *Attorney, Agent, or Firm*—Ratner & Prestia

(57) ABSTRACT

A hydraulic unit for brake systems includes a housing (4), which is provided with an accumulator-receiving bore (1) that is oriented parallel to the axis of the valve-receiving bores (2, 2') of the two valve rows (X, Y) and the motor-receiving bore (3), wherein the accumulator-receiving bore (1) and the valve-receiving bores (2, 2') of the first and second valve rows (X, Y) open next to one another into a first end face of the housing (4).

34 Claims, 7 Drawing Sheets

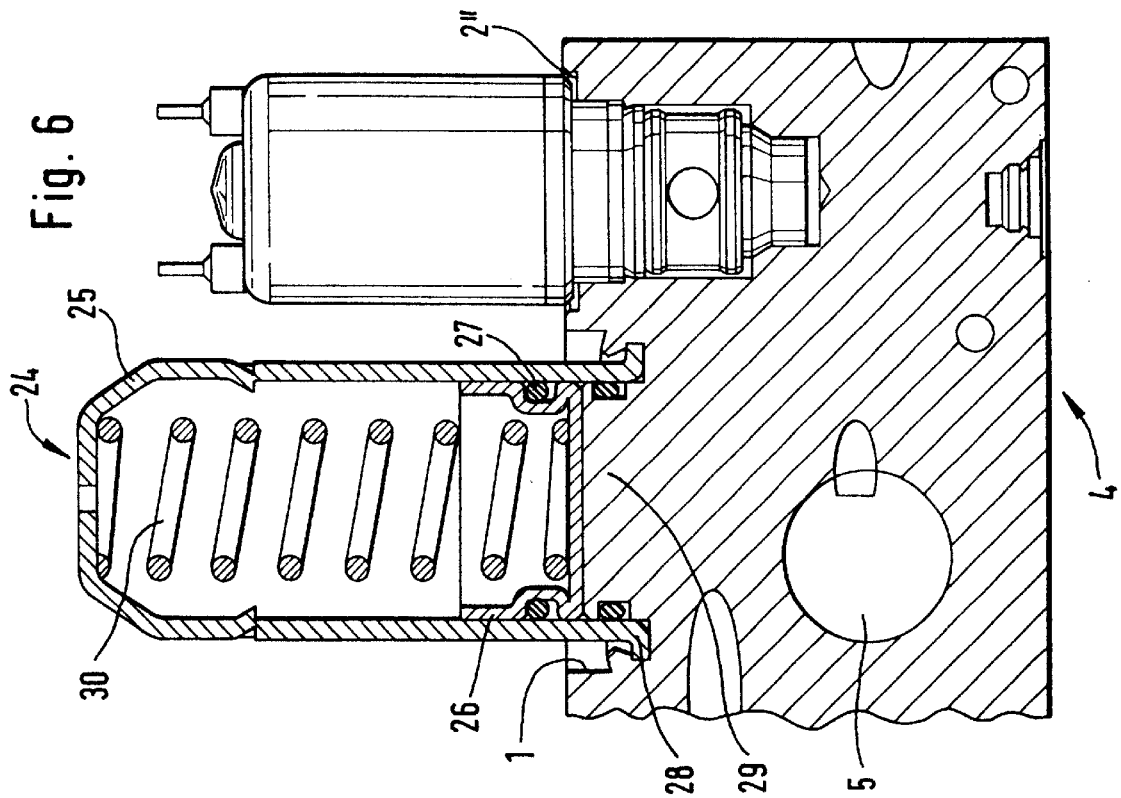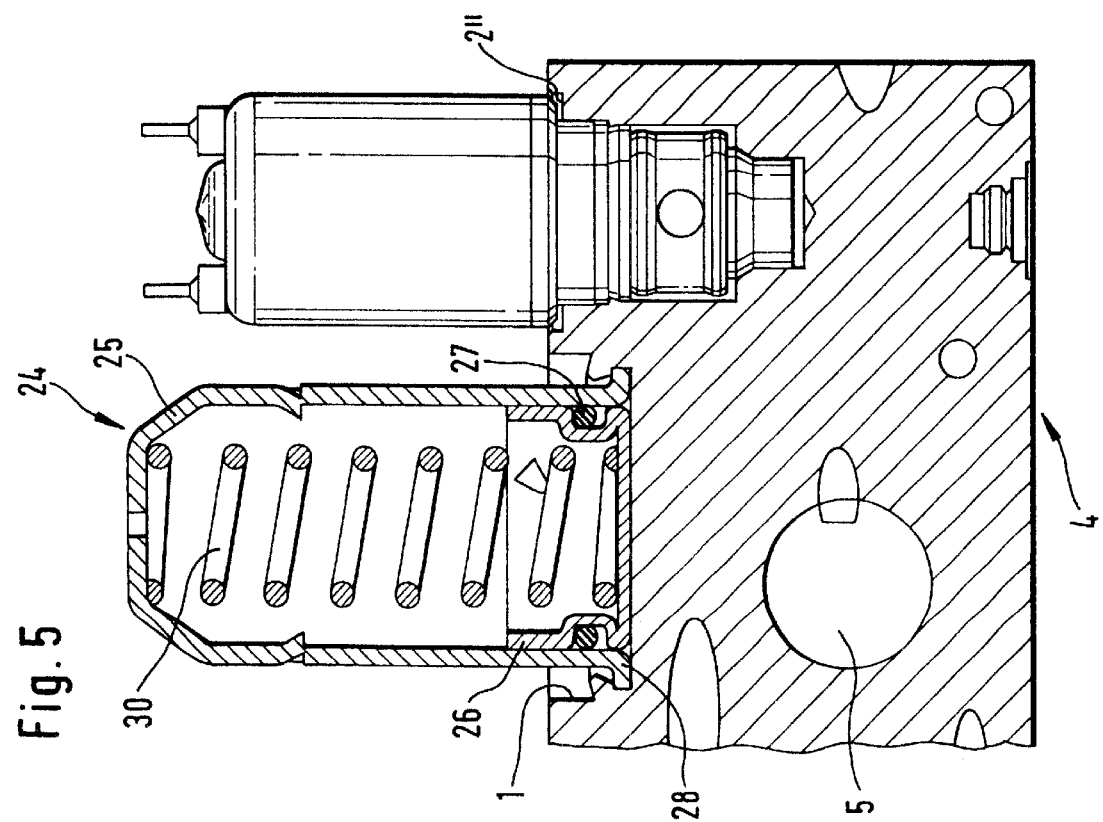

HYDRAULIC UNIT FOR SLIP-CONTROLLED BRAKE SYSTEMS

FIELD OF THE INVENTION

This application is the U.S. national-phase application of PCT International Application No. PCT/EP98/07226.

The present invention discloses a hydraulic unit for slip-controlled braking systems having a housing defining a number of bores for accommodating inlet and discharge valves, a pump, a motor for driving the pump, and an accumulator. Such housings also define pressure fluid channels for connecting the valves, pump-receiving bores and accumulator-receiving bores and establishing a hydraulic connection between a brake pressure transducer and several wheel brakes.

BACKGROUND OF THE INVENTION

Patent application DE 40 13 160 Al already discloses a hydraulic unit for a slip-controlled braking system, wherein several valve-receiving bores for inlet and discharge valves are arranged in a first and second valve row. A pump bore is provided outside the two valve rows in the block-shaped housing, which is oriented transversely to the direction in which the valve-receiving bores open into the housing. Furthermore, a motor-receiving bore oriented vertically in the pump bore is provided outside the two valve rows in the housing. Additional location bores for accumulator elements and damping chambers are located vertically to the axes of the valve-receiving bores, which are separated from the valve rows through the pump bore. There are both inlet and discharge valves in each of the two valve rows, with the discharge valves always being located between the valve-receiving bores of the inlet valves, so that the accumulator elements—which also act together functionally with the discharge valves—are arranged in alignment to one pair of discharge valves respectively in the housing. The receiving bores for the accumulator elements are limited on both sides by noise-damping chambers which are hydraulically connected both to the pressure side of the pump and the inlet valves in both valve rows.

Due to the bores for the accumulator elements and the damping chamber, which extend to the side of and at right angles to the axis of the pump-receiving bore, a lot of space is needed to integrate all receiving bores in the housing. Consequently, the ensuing outer dimensions of the block-shaped housing give rise to correspondingly large space requirements for the hydraulic unit in the vehicle. Another disadvantage is that the proposed arrangement of bores in the housing allows no free space for arranging additional receiving bores if the outer dimensions of the block-shaped housing remain the same, so that the hydraulic unit cannot be expanded functionally with the given dimensions. In addition, since the inlet and discharge valves are distributed on both valve rows, pressure fluid attachments which run to the wheel brakes are distributed on both lateral surfaces of the housing and this gives rise to additional space requirements on both sides of the housing as well as for guiding the connecting lines outside the housing.

U.S. Pat. No. 5,449,226 discloses a hydraulic unit for slip-controlled brake systems, whose inlet and discharge valves are provided in valve-receiving bores of two valve rows arranged in an offset position to a pump bore in a housing. Separated by a threaded bore extending perpendicularly into the housing at the level of the pump bore, which is provided for fastening a cover for sealing the inlet and discharge valves, there are several accumulator-receiving bores and noise-damping chambers in a row that are arranged outside the cover and also at equal distances from the side of the pump and threaded bore. The accumulator-receiving bores' far location away from the side of the pump bore, thus, can be attributed to the cover attachment, cover size and the arrangement of a generously dimensioned silent block (unit holder) which needs space between the accumulator-receiving bores and the cover. The pressure fluid channels are provided only in a vertical and horizontal arrangement in the housing.

SUMMARY OF THE INVENTION

Thus, it is an object of the present invention to improve a hydraulic unit of the type described above in such a way that, although the dimensions of the housing are kept as small as possible, all receiving bores can be optimally arranged in the housing and such arrangement can be expanded by simple means to include other functions when the location concepts have a uniform design.

According to the present invention, this object is solved for a hydraulic unit of the type mentioned above by means of a connecting channel which connects the accumulator receiving bore and at least one of the discharge valve receiving bores and a return flow channel connecting the accumulator receiving bore and the pump bore, wherein both the connecting channel and the return flow channel extend at an inclined angle (which either may be the same or different) relative to a plane of the housing parallel to the first end face (or bottom surface in situations when the first end face is disposed at the bottom in operation).

BRIEF DESCRIPTION OF THE DRAWINGS

Other features and advantages of the invention will be described below by taking as an example a configuration of a hydraulic unit that is shown in several drawings in which:

FIGS. 5 to 7 show accumulator bores adapted to different low-pressure accumulator designs.

Figure 1:
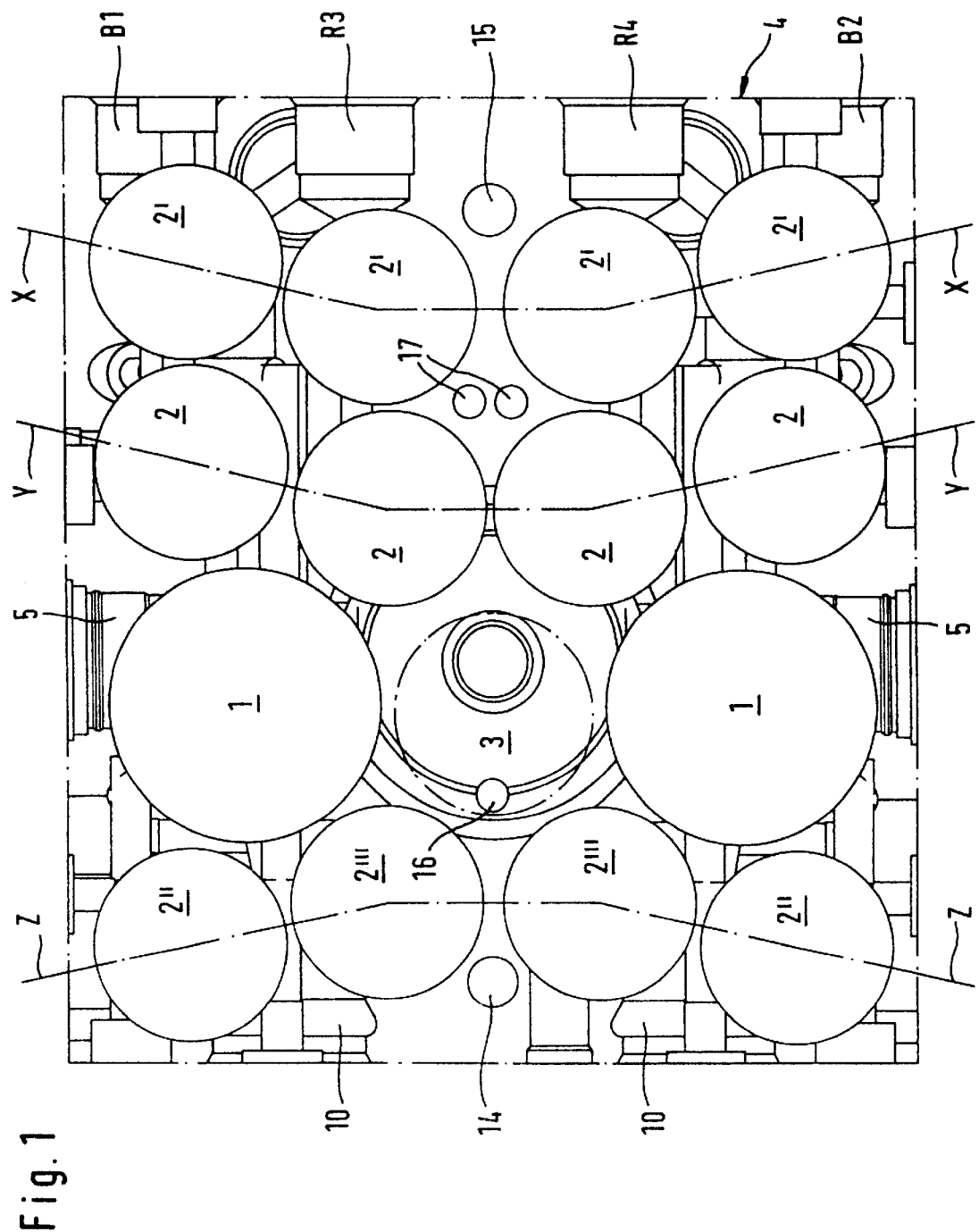
FIG. 1 is a top view of the bottom surface of the hydraulic unit, on which the valve- and accumulator-receiving bores are arranged.

In the representation according to FIG. 1, the top view of the block-shaped housing 4 is enlarged considerably. The bottom surface of the housing 4 contains altogether eight valve-receiving bores 2,2' in a first and second valve row X,Y, with electromagnetically actuated inlet and discharge valves being inserted in these receiving bores. To the side of—and, consequently, outside—the two valve rows X,Y there is a pump-receiving bore 5 which is substantially covered (from the bottom, looking up) by two parallel accumulator-receiving bores 1 in the figure. The accumulator-receiving bores 1 are parallel to the axis of the valve-receiving bores 2,2' as well as to the side of the two valve rows X,Y, whereas the pump-receiving bore 5 extends substantially parallel to the valve rows X,Y and transverse to the axis of the valve-receiving bores 2,2'.

In the middle between the two accumulator-receiving bores 1 is a motor-receiving bore 3 that extends parallel to the axis of the accumulator-receiving bores 1 into the pump-receiving bore 5. The motor-receiving bore 3, which accordingly has an axis oriented perpendicularly relative to the axis of the pump bore 5, not only holds the flange of an electric motor used for driving a pump that is fastened in the pump-receiving bore 5, but also holds the eccentric or crank drive needed for the pump. Taking into consideration the receiving bores described above, there is a high integration density of the individual functional elements on the bottom surface of the valve-housing 4, the area of which has been minimized. This is based on the concept of the invention to align the accumulator-receiving bores 1, the valve-receiving bores 2,2' and the motor-receiving bore 3 only parallel to their axes and to distribute the accumulator-receiving bores 1 and the valve-receiving bores 2,2' next to one another on one single surface of the housing if possible, which, as clarified by the following three-dimensional representations, is limited to as small a bore depth in the housing 4 as possible.

The second valve row Y located immediately next to the pump-receiving bore 5 and the accumulator-receiving bore 1 only holds the discharge valves required for reducing the braking pressure in the wheel brakes. Thus, a particularly short connection for the pressure fluid is needed from the discharge valves via the accumulator-receiving bores 1, where a piston accumulator or diaphragm accumulator is provided for temporarily storing the pressure fluid coming from one or more discharge valves, to the connection on the inlet side of the pump bore 5. The inlet valves are located in the valve-receiving bores 2' of the first valve row X, which is separated from the pump-receiving bore 5 and the accumulator-receiving bores 1 by the second valve row Y. Arranging the inlet valves in the first valve row X offers the advantage that the attachments B1, B2 of the brake-pressure transducer (e.g., a master brake cylinder) opening into housing 4 near the first valve row X and the attachments R1, R2, R3, R4 leading to the wheel brakes also can be arranged as close together as possible; hence, there is a uniform connection pattern for the brake lines on one lateral surface of the housing 4.

FIG. 1 further shows a third row of valves Z, which opens into the housing surface of the housing 4 far from the first and second valve row X,Y; in particular, the third valve row Z is arranged adjacent a side surface of the housing 4 opposite the side surface adjacent the first valve row X. Thus, the third valve row Z is arranged directly next to the two accumulator-receiving bores 1 which ensures a simple functional expansion of the hydraulic unit designed for controlling the blocking pressure for the purpose of traction or vehicle dynamics control. For this purpose, electromagnetic valves are used in the two outer valve-receiving bores 2", with these valves being designed as electrical change-over valves that are closed in their initial position. Electromagnetic valves that are open in their initial position are arranged in the two valve-receiving bores 2''' of valve row Z lying in-between the two outer valve-receiving bores 2".

Figure 2:
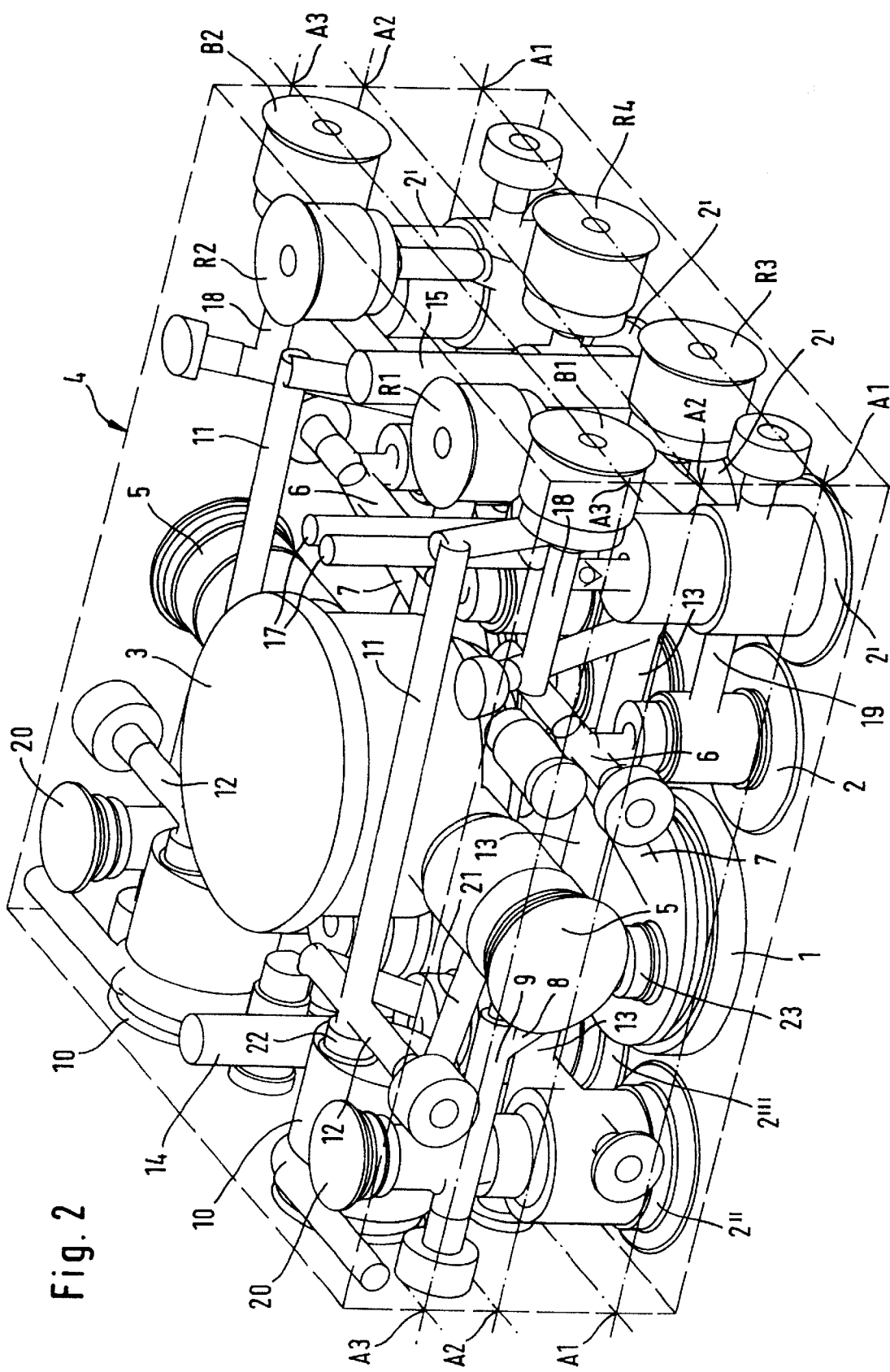
FIG. 2 is a three-dimensional representation of the housing shown in FIG. 1 so as to illustrate clearly all receiving bores and pressure fluid channels.
Figure 3:
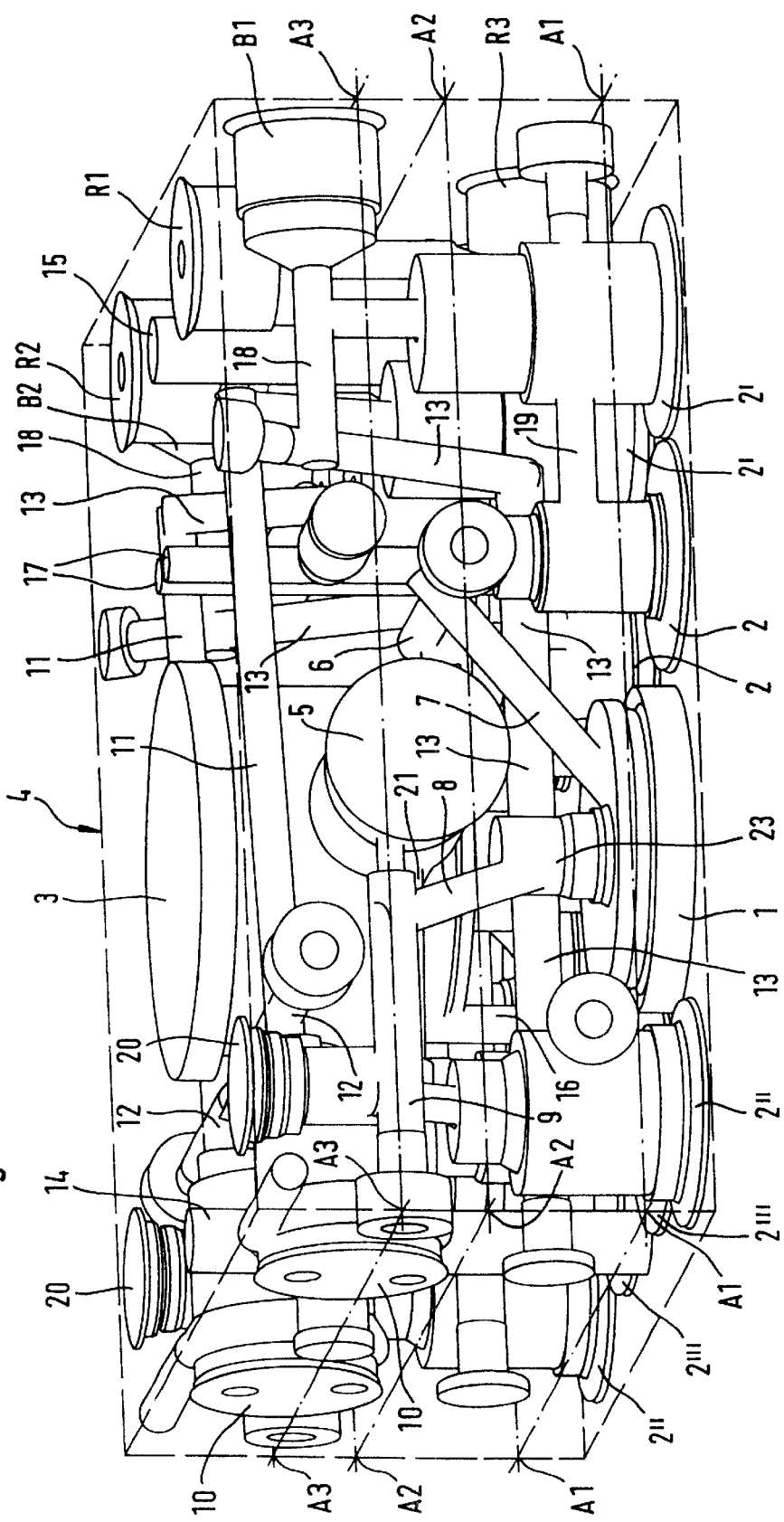
FIG. 3 shows a view rotated around the vertical and longitudinal axes of the housing to illustrate clearly the details shown in FIGS. 1 and 2.

FIGS. 2 and 3 show how the pressure fluid channels that are needed to make the hydraulic unit function as desired should be connected to the described receiving bores. Finally, it should be mentioned with respect to FIG. 1 that, despite the extremely dense arrangement of the described bores for holding the individual functional elements, the space remaining between the two valve rows X,Y can be used for holding through openings 17 which can be used for supplying power to the electric motor within motor receiving bore 3. In view of the fact that the inner valve-receiving bores are arranged offset in relation to the outer valve-receiving bores of each valve row X,Y,Z in the direction of the motor-receiving bore 3 respectively, there remains free space outside the first valve row X and third valve row Z. This free space can be used to arrange through or threaded holes 14,15 for fastening a cover over the bottom surface according to the drawing, wherein such cover also can be part of an electronic controller integrated in it. In the same way the flange of electric motor set in the motor-receiving bore 3 can be fastened in the through holes 14,15 on the end face of the housing 4 facing away from valve rows X,Y,Z by means of a screwed connection (i.e., the top face). Finally, a leakage bore 16 for draining any fluid that may accumulate can be provided with this arrangement and design of the motor-receiving bore 3, if necessary. Yet, due to the fact that it can hold a generous quantity of fluid, the proposed motor-receiving bore 3 can store a certain quantity of leakage fluid, so that the represented leakage bore 16 may not be needed.

Proceeding from the description of the representation shown in FIG. 1, FIG. 2 shows the spatial arrangement of the pressure fluid channels and receiving bores of the hydraulic unit which lead to a uniform arrangement of the bores in the block. This three-dimensional representation of the housing 4 shows that the motor-receiving bore 3 opens into the housing surface (or top face) which is opposite the housing surface with the valve rows X,Y,Z and accumulator-receiving bores 1. Thus, the top face of the housing holding the electric motor provides a generous location for the motor housing, with it being possible, if so desired or required, to use also the vertical through openings 17 provided in the housing 4 for the power supply of the motor and the through holes 14,15 for fastening the flange of the electric motor. Despite the small dimensions of the housing 4, the top face of the housing 4 on the side of the motor can accommodate wheel brake attachments R1,R2, which, for example, lead to the wheels of the rear wheels. These attachments, via relatively short pressure fluid channels, lead to the outer valve-receiving bores 2' in the first valve row X and, hence, to the attachments of the brake pressure transducer B1, B2 via the inlet valves that are opened in their initial positions arranged therein. The attachments of the brake pressure transducer B1, B2 also are connected to the two valve-receiving bores 2' located within valve row X via a pressure fluid branch covered in the view shown. The wheel brake attachments R3, R4 (which lead to the front wheel brakes in the example shown) that are provided together with the attachments of the brake pressure transducer B1, B2 on a joint lateral surface also are connected to the two valve-receiving bores 2' located within valve row X.

In order to be able to drain the brake fluid supplied by the brake pressure transducer to the wheel brakes via the first valve row X in the direction of the accumulator-receiving bore 1, there is a short, horizontal pressure fluid connection 19 between every pair of diametrical valve-receiving bores 2,2' of the first and second valve rows X,Y, whereby, when the electromagnetically actuated discharge valve in the second valve row Y is open, the pressure fluid collected in the corresponding valve-receiving bore 2' of the first valve row X flows into a horizontal pressure fluid channel 6 designed as a collecting channel, which leads to the accumulator-receiving bore 1 via a connecting channel 7 that slopes downwards in the direction of the housing surface shown in FIG. 1. According to the drawing, the accumulator-receiving bore 1 also is provided with a return flow channel 8 that runs in the opposite direction and upwards at an angle, with this return flow channel 8 leading, at a defined or noticeable angle (e.g., between about 5 and 85 degrees depending on the location requirements) relative to a plane parallel to the first end face, to a horizontal pressure fluid channel 9 that opens into the pump-receiving bore 5. The pressure fluid channel 9 is also connected to a pulsation damper 20. Between the accumulator-receiving bore 1 and the return flow channel 8 there is a return valve 23 that is closed in the direction of the accumulator-receiving bore 1. The receiving bore for the pulsation damper 20 runs concentrically to the outer valve-receiving bore 2", the third valve row Z coming from the direction of the top face of the housing 4 on the side of the motor, and, hence, a joint pressure fluid connection to the horizontal pressure fluid channel 9 leading to the inlet side of the pump is ensured by means of the outer valve-receiving bore 2".

In addition, a pressure fluid channel 13 extending horizontally between the pump-receiving bore 5 and the vertical accumulator-receiving bore 1 opens into, below the pressure fluid channel 9, the vertical valve-receiving bore 2" located on the outside, which holds the electromagnetic valve that is closed in its initial position; this pressure fluid channel also is connected to one of the two attachments of the brake pressure transducer B1,B2 respectively. This pressure fluid channel 13 also leads to valve-receiving bore 2'" respectively, which is provided in valve row Z, i.e. next to the valve-receiving bore 2" that holds the electric change-over valve. The electromagnetic valve open in its initial position and inserted in valve-receiving bore 2'" makes possible a pressure fluid connection leading from the pressure fluid channel 11 extending above pump-receiving bore 5 in the housing 4 to the valve-receiving bores 2' in the first valve row X and, hence, to the wheel brake attachments R1,R3 or R2,R4 of one of the two brake circuits. Approximately in a middle location of the valve-receiving bores 2", 2'", there is a noise damping chamber 10 above the third valve row Z respectively, into which a pressure connection 21 coming from the pump-receiving bore 5 opens for each brake circuit. A connection to the horizontal pressure fluid channel 11 is provided at the outlet of the noise damping chamber 10 via an orifice plate 22. The longitudinal axis of the shown noise damping chamber 10 of every brake circuit is oriented towards the lateral surface of the housing 4 and, thus, extends transversely to the third valve row Z.

Figure 4:
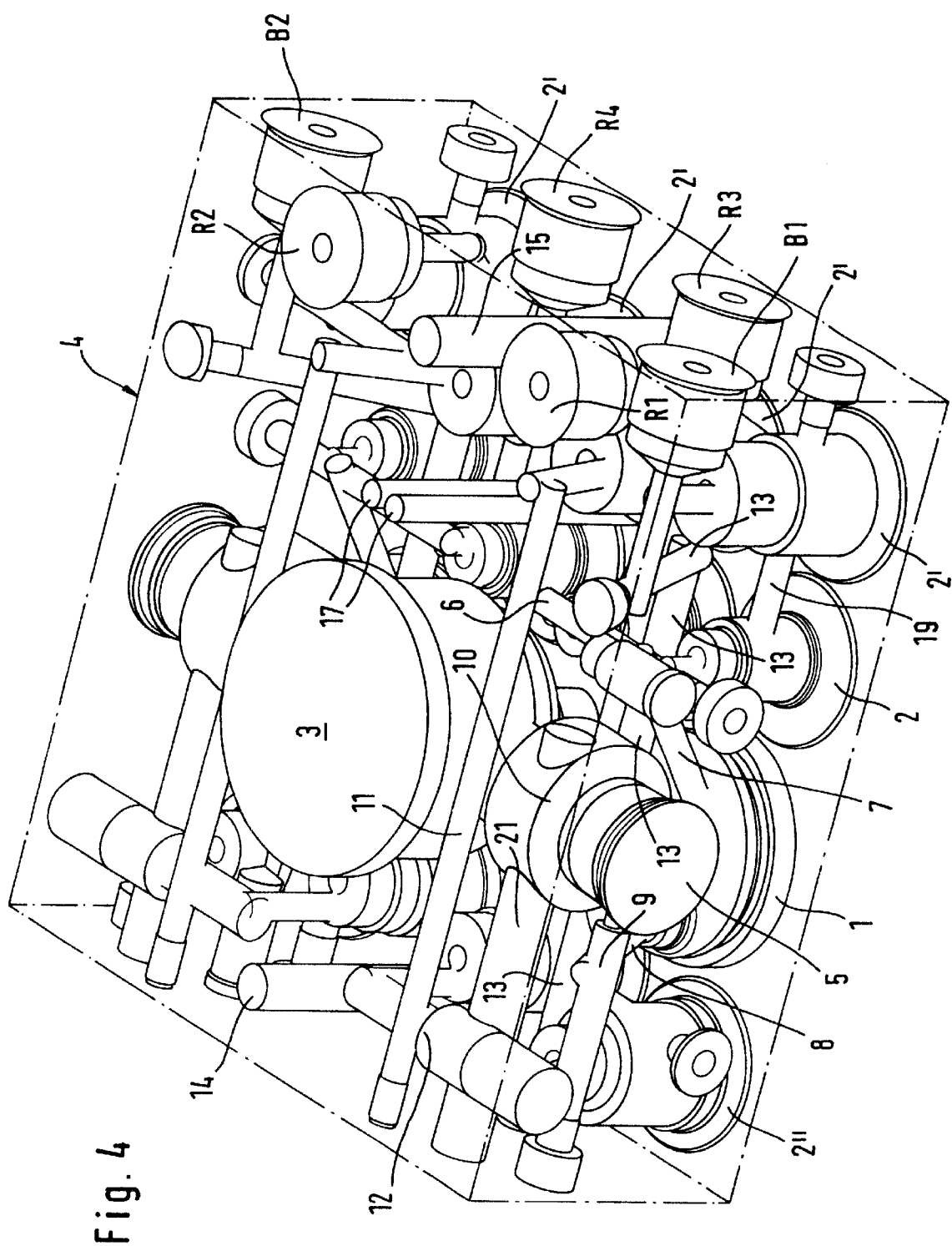
FIG. 4 is a three-dimensional representation of a housing modified in comparison to the embodiment shown in FIGS. 1 to 3, with such housing having a damping chamber integrated in the pump-receiving bore.

Further space is saved when the noise damping chamber 10 is designed as a ring-shaped space that is assigned directly to the pump-receiving bore 5 concentrically to the pressure side of the pump, for example by undercutting the pump-receiving bore 5. In this connection, the pressure connection 21 of the pump can be connected to the pressure fluid channel 11 leading to the first valve row X without any significant changes within the bores. A corresponding embodiment will be discussed later on the basis of FIG. 4.

The arrangement of the receiving bores and the course of the pressure fluid channels was limited to the two wheel brakes R1,R3 of a brake circuit in FIG. 2. The same functional as well as mirror-inverted arrangement exists for the bores of housing 4 for representing the second brake circuit, which need not be discussed in detail due to the constructional similarities.

In particular taking into consideration the representation according to FIG. 2, the arrangement of the receiving bores and pressure fluid channels on several parallel, horizontal reference surfaces of the housing A1,A2,A3 is to be illustrated on the basis of FIG. 3. According to the drawing, the lowest reference surface of the housing A1 (indicated by a dotted line) is located in the area of the accumulator-receiving bores 1 and valve-receiving bores 2,2',2",2'" and, thus, at the level of the wheel brake attachments R3,R4. Another reference surface of the housing A2, located in the middle of the housing 4, extends along the pressure fluid channel 6 and clearly shows the sloped angle of the connection channel 7 in the direction of the accumulator-receiving bore 1. Pressure fluid channel 9 is located above the reference surface of the housing A2 and, consequently, on the level of the reference surface of the housing A3. The return flow channel 8, coming at a slope from the direction of the reference surface of the housing A2 and opening into the pressure fluid channel 9 at reference surface of the housing A3, is oriented towards this pressure fluid channel 9. The pressure fluid branches 18 for the attachments of the brake pressure transducer B1,B2, which extend parallel to the housing levels A1 to A3, and horizontal channels 11 of the noise damping chambers 10 are located above the reference surface of the housing A3. The reference surfaces of the housing A1 to A3 show the distribution of the pressure fluid channels and receiving bores which lead to as great an integration density of all functional elements as possible. Of special importance in this connection is that the hydraulic connection between the valve-receiving bores 2 of the second valve row Y, the accumulator-receiving bore 1 and the pump-receiving bore 5 by means of the pressure fluid channel 6, connection channel 7, return flow channel 8 and pressure fluid channel 9 is kept as short as possible. They represent—a so-called secondary circuit for every brake system with an anti-lock system—undesired dead space within the housing 4, which needs to be ventilated and uses fluid volume.

Since the hydraulic unit described, when it has the same design, is not limited to an anti-locking function, but can be expanded by means of very simple mechanical production measures to accommodate a third valve row Z for the purpose of obtaining anti-slip as well as driving dynamics control, the above-described dead space separated from the primary brake circuit by the discharge valve is not appreciably expanded by directly connecting the valve-receiving bore 2", which is usually closed by an electromagnetic valve, to the pressure fluid channel 9 leading to the inlet side of the pump. Another advantage of the present invention can be attributed to the free space located between the accumulator-receiving bore 1 and the pump-receiving bore 5, since it can be used for directly connecting the pulsation damper 20 to the return flow channel 8, so that, instead of the arrangement shown in the drawing, the pulsation damper 20 can be arranged parallel to the axis of the pump-receiving bore 5 in the lateral surface of the housing 4 and, hence, at the level where the return flow line 8 is connected to the accumulator-receiving bore 1.

As an alternative to the arrangement shown in FIGS. 1 to 3, FIG. 4 shows a co-axial arrangement of the noise-damping chamber 10 with respect to the pump-receiving bore, wherein such arrangement can be obtained by undercutting the pump-receiving bore 5. In the present embodiment the pressure fluid channel 21 on the pressure side of the pump still runs in the direction of the noise-damping chamber 10 shown in FIGS. 1 to 3. By shifting the noise-damping chamber 10 into the area of the pump-receiving bore 5, the extension of the pressure fluid channel 21 on the pressure side of the pump is provided with a blind plug in the housing 4. Therefore, the pressure fluid channel 21 runs directly to the pressure fluid channel 11 of each brake circuit via the pressure fluid branches 12 already shown in FIGS. 2 and 3. All other characteristics shown in FIG. 4 correspond to the details already described in FIGS. 1 to 3 and, consequently, can be found there.

Figure 7:
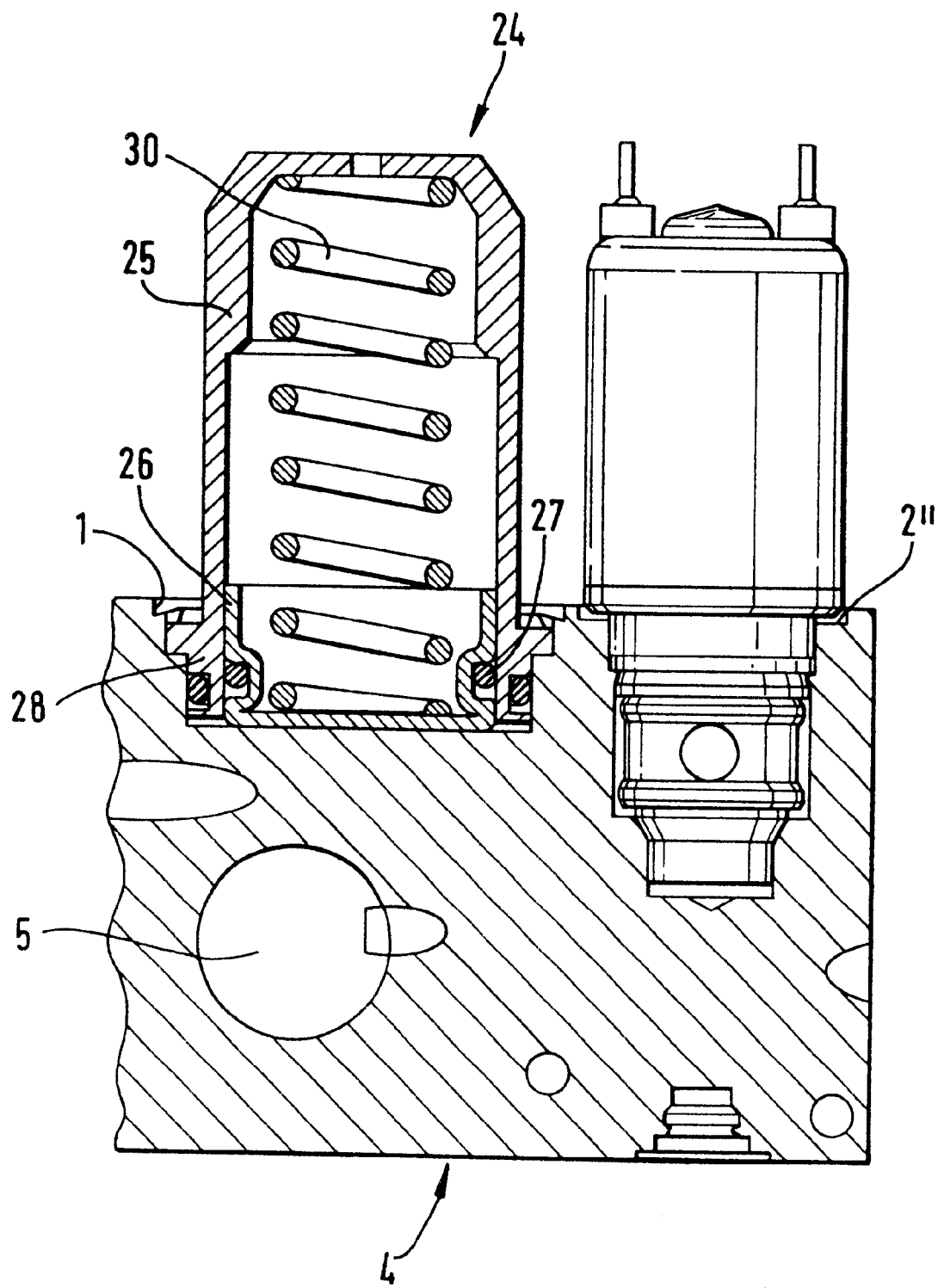

FIGS. 5, 6 and 7 show advantageous embodiments to illustrate different attachments and designs of low-pressure accumulators 24 which seal the accumulator-receiving bores 1.

In this connection, FIG. 5 shows a low-pressure accumulator 24 designed as a piston-type accumulator, whose housing 25 consists of a metal part produced by deep drawing. The piston 26, which preferably is pressed from a thin metal part, is sealed by means of an O-ring 27 and guided in the housing 25. Like the piston head, the surrounding collar 28 of housing 25 is attached to the end face of the relatively flat accumulator-receiving bore 1 and is fastened in the housing 4 by known means, such as a caulking tool.

Deviating from but also supplementary to the description in FIG. 5, FIG. 6 shows a cylinder-shaped projection 29 in the accumulator-receiving bore 1 that holds an O-ring in a ring-shaped groove to seal the accumulator housing 25.

Contrary to the details in FIGS. 5 and 6, it is proposed in FIG. 7 that the accumulator housing 25 be made of a solid turned part with a flange, which holds an O-ring on its outer side for sealing the accumulator-receiving bore 1.

In all preceding embodiments according to FIGS. 5, 6 and 7, the low-pressure accumulator 24 is a subassembly that can be manipulated independently since the piston 26 and its pressure spring 30 always are preassembled in the accumulator housing 25 before they are inserted in the accumulator-receiving bore 1.

Figure 8:
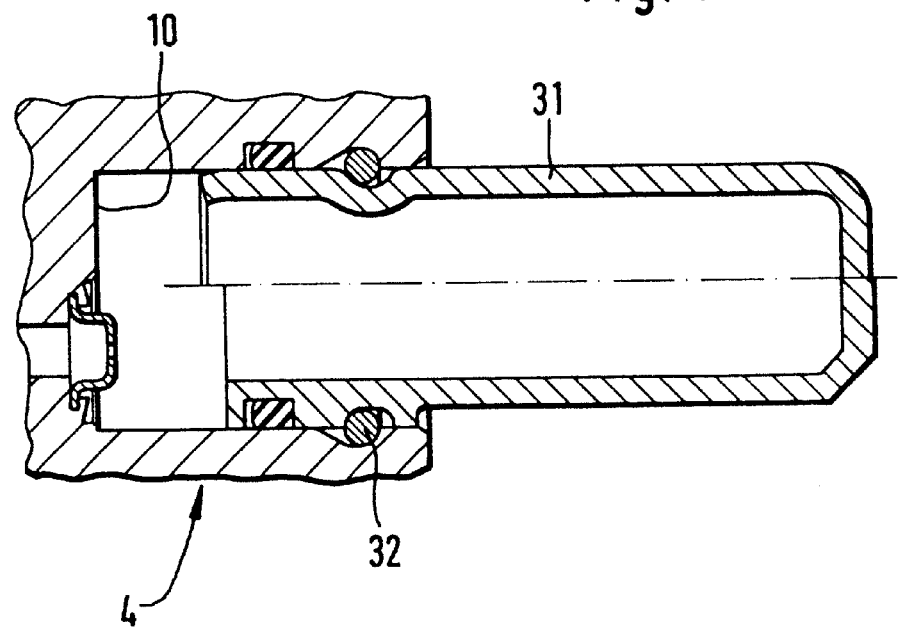
FIGS. 8 and 9 show different embodiments for the design of the damping chambers in the housing.
Figure 9:
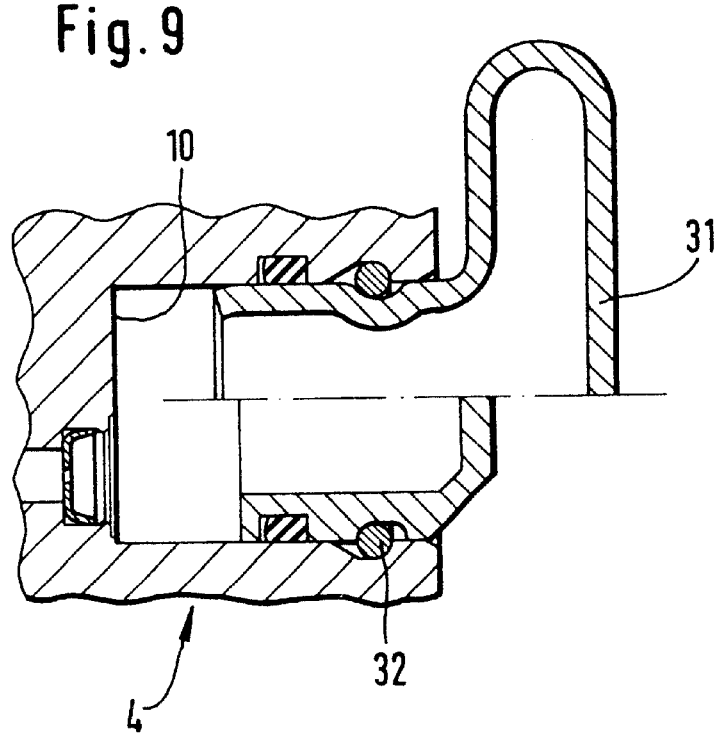

FIGS. 8 and 9 show possible embodiments of the noise-damping chamber 10 which can be closed off tightly against pressure fluid by means of tubular sealing elements 31 having different designs and fluid-holding capacities. The tubular sealing elements 31 preferably are made of a thin-metal part in one piece or two pieces. The tubular sealing elements, for example, are attached in the noise-damping chamber 10 by means of a locking wire 32. The thin-metal part which is designed as a cover lock is sealed by means of an O-ring.

In conclusion, the invention discloses a concept for arranging bores in a housing 4, which leads to a uniform channel concept and the possibility of using the same arrangement of receiving bores for the different functions of the hydraulic unit in order to ensure the multi-functionality of the housing 4 without having to modify the housing 4 to any considerable extent. At the same time, the receiving bores and pressure fluid channels discussed are arranged in as space-saving a manner as possible, so that the dimensions of the housing 4 are kept to a minimum. Thus, the hydraulic unit proposed by the present invention can be produced by means of uniform clamping, drilling and milling operations, irrespective of whether a hydraulic unit for use in the anti-lock system of a brake system or a hydraulic unit expanded for use in driving dynamics control is to be produced. By arranging the accumulator-receiving bore 1 to the side of the valve-receiving bores 2,2',2",2'" the low-pressure accumulator 24 can be located in a particularly protected place within a cover sealing the valve-receiving bores 2,2',2",2'", with the depth of the accumulator-receiving bore 1 in the housing 4 being limited to a necessary depth for fastening the low-pressure accumulator 24 and either all of or at least the majority of the required operating volume of the low-pressure accumulator 24 being shifted into the cover-shaped housing 25.

In addition, the invention is characterized in that the pressure fluid needs to cover particularly short distances in the area of the primary and secondary brake circuits, which were shifted to the housing 4. Since the valve-receiving bores 2 for the discharge valves as well as the accumulator-receiving bores 1 are arranged as closely as possible to the pump-receiving bore 5, the resulting dead space volume for the secondary brake circuit needs minimal ventilation and filling.

List of Reference Numbers

1 Accumulator-receiving bore
2,2' valve-receiving bore
2",2'" valve-receiving bore
3 Motor-receiving bore
4 Housing
5 Pump bore
6 Pressure fluid channel
7 Connection channel
8 Return flow channel
9 Pressure fluid channel
10 Noise-damping chamber
11 Pressure fluid channel
12 Pressure fluid branch
13 Pressure fluid channel
14 Through hole
15 Through hole
16 Leakage bore
17 Through opening
18 Pressure fluid branch
19 Pressure fluid connection
20 Pulsation damper
21 Pressure attachment
22 Orifice plate
23 Return valve
24 Low-pressure accumulator
25 Housing
26 Piston
27 O-ring
28 Collar
29 Projection
30 Pressure spring
31 Tubular sealing element
32 Locking wire
A1,A2 Reference level of the housing
A3,A4 Reference level of the housing
R1,R2 Wheel brake attachments
R3,R4 Wheel brake attachments
B1,B2 Brake pressure transducer attachments
X,Y,Z Valve rows

What is claimed is:

1. A hydraulic unit for slip-controlled brake systems
  with a housing that contains inlet and discharge valves in several valve-receiving bores in a first and second valve row,
  with a pump bore arranged outside the two valve rows in the housing, which is oriented transversely to the direction in which the valve-receiving bores open into the housing,
  with a motor-receiving bore oriented vertically to the pump bore and arranged outside the two valve rows in the housing,
  with an accumulator-receiving bore opening into the housing outside the two valve rows,
  with several pressure fluid channels that connect the valves, the pump bore and the accumulator-receiving bore and establish a hydraulic connection between one brake pressure transducer and several wheel brakes, wherein the accumulator-receiving bore is arranged parallel to the axis of the valve-receiving bores of the two valve rows and the motor-receiving bore and that the accumulator-receiving bore and the valve receiving bores of the first and second valve row open next to one another into a first end face of the housing,
  characterized in that the bore depth of the accumulator-receiving bore has been minimized to such an extent that it can cover the pump bore and that as a result of the minimal bore depth a connecting channel leading to the valve-receiving bore of the second valve row and return flow channel connected to the pump bore lead at an inclined angle relative to the end face of the housing and to the accumulator-receiving bore.

2. A hydraulic unit according to claim 1, characterized in that the valve-receiving bores for the discharge valves are arranged in the second valve row, which is located directly next to the pump bore and the accumulator-receiving bore.

3. A hydraulic unit according to claim 2, characterized in that several valve-receiving bores of a third valve row open into the first end face of the housing at a distance from the first and second valve rows, with the third valve row being located directly next to the accumulator-receiving bore.

4. A hydraulic unit according to claim 3, characterized in that an electromagnetic valve that is open in its initial position is located between a brake pressure transducer attachment and the inlet valves of the first valve row in the vale-receiving bores of the third valve row respectively to interrupt the pressure fluid connection.

5. A hydraulic unit according to claim 4, characterized in that a magnetic valve that is closed in its initial position is provided in a valve-receiving bore of the third valve row as a direct hydraulic connection between the brake pressure transducer attachment and an attachment of the pump-receiving bore on the inlet side.

6. A hydraulic unit according to claim 2, characterized in that the valve-receiving bores of the second valve row extend up to a second reference level of the housing and that pairs of the second valve row valve-receiving bores are connected to one pressure fluid channel respectively, which opens into a connecting channel that runs at an inclined angle from the second to a first reference level of the housing to the accumulator-receiving bore.

7. A hydraulic unit according to claim 2, characterized in that the return flow channel leads at an angle of slope to a pressure fluid channel that opens into the pump-receiving bore, with such pressure fluid channel being located outside a first and second reference level of the housing on a third reference level of the housing.

8. A hydraulic unit according to claim 7, characterized in that the pump-receiving bore is delimited by the sloped connecting channel and return flow channel and located between the second and third reference level of the housing.

9. A hydraulic unit according to claim 1, characterized in that the inlet valves are arranged in the valve-receiving bores of the first valve row, which is spatially separated from the pump bore and the accumulator-receiving bore by the second valve row.

10. A hydraulic unit according to claim 1, characterized in that only the inlet and discharge valves in the valve-receiving bores of the first and second valve rows are actuated electromagnetically to control the anti-blocking pressure in the wheel brakes.

11. A hydraulic unit according to claim 1, characterized in that an input of the pump-receiving bore on the pressure side opens into a noise-damping chamber which is arranged outside a first and second reference level of the housing.

12. A hydraulic unit according to claim 11, characterized in that the noise-damping chamber is designed as a ring-shaped space oriented co-axially towards the pump-receiving bore, which is located at the level of the pump-receiving bore on the pressure side.

13. A hydraulic unit according to claim 11, characterized in that the noise damping chamber is arranged between pressure fluid attachments of the valve-receiving bores of a third valve row.

14. A hydraulic unit according to claim 11, characterized in that the noise-damping chamber is connected to a first of the pressure fluid channels that is located at a distance from first, second and third reference levels of the housing and that a pressure fluid branch is connected to the first pressure fluid channel, which leads to a further valve-receiving bore of a further electromagnetic valve that is open in its initial position and located in a third valve row.

15. A hydraulic unit according to claim 1, characterized in that the pressure fluid channels extend in an opposite direction from several pressure fluid attachments of the brake pressure transducer opening into the housing and the wheel brakes in such a way that a third valve row can optionally be positioned in a first end face with the first and second valve row for the purpose of obtaining a multi-functional, uniform arrangement of bores in a block and can be connected to the pressure fluid channels, with the third valve row being arranged at a distance from the first and second valve row due to the accumulator-receiving bore located in the first end face.

16. A hydraulic unit according to claim 15, characterized in that the accumulator-receiving bore holds a low-pressure accumulator which forms a subassembly that can be manipulated independently.

17. A hydraulic unit for slip-controlled brake systems comprising:
   a plurality of inlet valves;
   a plurality of discharge valves;
   a housing defining:
      (a) a plurality of inlet valve receiving bores opening in a first end face of said housing and arranged in a first valve row for individually accommodating said plurality of inlet valves;
      (b) a plurality of discharge valves receiving bores opening in said first end face of said housing and arranged in a second valve row, adjacent said first valve row, for individually accommodating said plurality of discharge valves;
      (c) a pump bore arranged outside said first and second valve rows and oriented transversely to said inlet and discharge valve receiving bores;
      (d) a motor receiving bore having an axis extending perpendicularly to the axis of the pump bore and arranged outside said first and second valve rows in said housing;
      (e) an accumulator-receiving bore opening into said first end face of said housing outside said first and second valve rows, having an axis extending parallel to the axes of the inlet and discharge valve receiving bores and to the axis of the motor receiving bore, substantially covering said pump bore, and having a minimal bore depth;
      (f) a plurality of pressure fluid channels for connecting said inlet valve accommodating bores, said discharge valve accommodating bores, said pump bore, and said accumulator receiving bore and for establishing a hydraulic connection between a brake pressure transducer and a plurality of wheel brakes, said plurality of pressure fluid channels including: (i) a connecting channel connecting said accumulator receiving bore and at least one of said plurality of discharge valve receiving bores of said second valve row and (ii) a return flow channel connecting said accumulator receiving bore and said pump bore, wherein said connecting channel and said return flow channel extend at at least one inclined angle relative to a plane of said housing parallel to said first end face.

18. A hydraulic unit according to claim 17, wherein said second valve row is located directly next to the pump bore and the accumulator receiving bore.

19. A hydraulic unit according to claim 18, wherein said accumulator receiving bore is disposed at a first reference level of said housing, said plurality of discharge valve receiving bores of said second valve row extend up to a second reference level of the housing wherein said second reference level is further from said first end face than said first reference level, and said connecting channel is connected to said at least one of said plurality of discharge valve receiving bores via a first of said plurality of pressure fluid channels and extends at an inclined angle such that said connecting channel extends between said first reference level and said second reference level.

20. A hydraulic unit according to claim 18, wherein said return flow channel extends at an inclined angle to a second of said plurality of said pressure fluid channels that opens into said pump bore, wherein said second pressure fluid channel is located at a third reference level of said housing further from said first end face than said second reference level.

21. A hydraulic unit according to claims 20, wherein said pump bore is delimited by said connecting channel and said return flow channel and the axis of said pump bore is located between the second and third reference levels of the housing.

22. A hydraulic unit according to claim 17, wherein said first valve row is spatially separated from the pump bore and the accumulator receiving bore by said second valve row.

23. A hydraulic unit according to claim 17, wherein a plurality of supplemental valve receiving bores of a third valve row open into said first end face of said housing for accommodating a plurality of supplemental valves, wherein said third valve row is spatially separated from said first and second valve rows, and the third valve row is located directly next to said accumulator receiving bore.

24. A hydraulic unit according to claim 23, wherein a first of said supplemental valves that is open in its initial position is located hydraulically between an inlet from said brake pressure transducer and said plurality of inlet valves to interrupt the pressure fluid connection.

25. A hydraulic unit according to claim 24, wherein a second of said supplemental valves that is closed in its initial position provides a direct hydraulic connection between said inlet from said brake pressure transducer and the inlet side of said pump bore.

26. A hydraulic unit according to claim 23, wherein the pump bore on the pressure side opens into a noise-damping chamber which is arranged outside the first and second reference levels of said housing.

27. A hydraulic unit according to claim 26, wherein said noise-damping chamber is arranged outside the first and second reference levels of said housing.

28. A hydraulic unit according to claim 26, wherein said noise-damping chamber is designed as a ring-shaped space oriented co-axially towards the pump bore.

29. A hydraulic unit according to claim 26, wherein said noise-damping chamber is arranged between pressure fluid attachments of the supplemental valve receiving bores of the third valve row.

30. A hydraulic unit according to claim 26, wherein said noise-damping chamber is connected to a third of said plurality of said pressure fluid channels located further from said first end face than said third reference level of the housing, and a pressure fluid branch, which is connected to said third pressure fluid channel, leads a first of said supplemental valves that is open in its initial position.

31. A hydraulic unit according to claim 17, wherein only said inlet valves and said discharge valves are actuated electromagnetically to control the anti-locking pressure in said plurality of wheel brakes.

32. A hydraulic unit according to claim 17, wherein said plurality of pressure fluid channels extend to an opposite direction from pressure fluid inputs from the brake pressure transducer opening into the housing and the attachments to the plurality of wheel brakes in such a way such that a third valve row is positioned in said first end face with the first and second valve row for the purpose of obtaining a multi-functional, uniform arrangement of bores in a block and is connected to said plurality of pressure fluid channels, with the third valve row being arranged spatially separate from the first and second valve rows due to said accumulator-receiving bore located in the first end face.

33. A hydraulic unit according to claim 32, wherein said accumulator-receiving bore holds a low-pressure accumulator which forms a subassembly that can be manipulated independently.

34. A hydraulic subassembly for slip-controlled brake systems comprising:
  a housing defining:
    (a) a plurality of inlet valve receiving bores opening into a first end face of said housing and arranged in a first valve row for individually accommodating a plurality of inlet valves;
    (b) a plurality of discharge valve receiving bores opening in said first end face of said housing and arranged in a second valve row, adjacent said first row, for individually accommodating a plurality of discharge valves;
    (c) a pump bore arranged outside said first and second valve rows and oriented transversely to said inlet and discharge valve-receiving bores;
    (d) a motor-receiving bore having an axis extending perpendicularly to the axis of the pump bore and arranged outside the two valve rows in said housing;
    (e) an accumulator-receiving bore opening into said first end face of said housing outside the two valve rows, having an axis extending parallel to the axes of the inlet and discharge valve-receiving bores and to the axis of the motor-receiving bore, substantially covering said pump bore and having a minimal bore depth;
    (f) a plurality of pressure fluid channels for connecting said inlet valve accommodating bores, said discharge valve accommodating bores, said pump bore, and said accumulator-receiving bore and for establishing a hydraulic connection between a brake pressure transducer and a plurality of wheel brakes, said plurality of pressure fluid channels including: (i) a connecting channel connecting said accumulator receiving bore and at least one of said plurality of discharge valve receiving bores of the second valve row and (ii) a return flow channel connecting said accumulator receiving bore and said pump bore, wherein said connecting channel and said return flow channel extend at at least one inclined angle relative to a plane of said housing parallel to said first end face.

* * * * *